M. M. WEIL.
COLLAR.
APPLICATION FILED APR. 18, 1922.
1,434,258.  Patented Oct. 31, 1922.
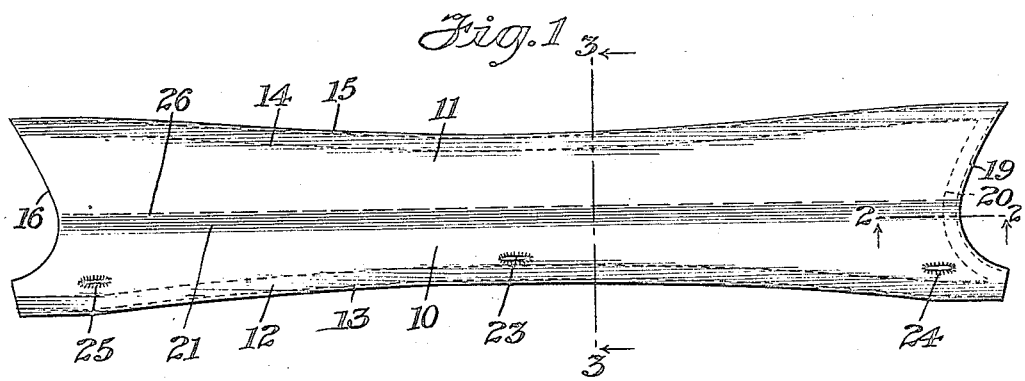
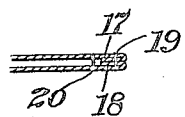
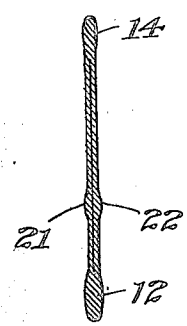
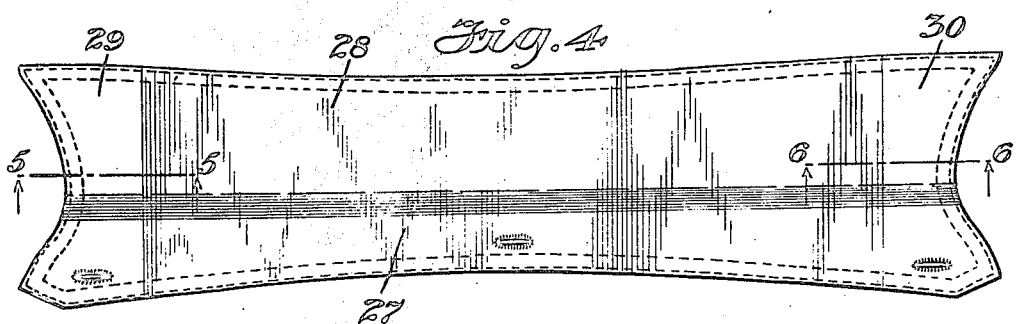
INVENTOR
Morton M. Weil
BY
HIS ATTORNEYS Patented Oct. 31, 1922.

1,434,258

UNITED STATES PATENT OFFICE.

MORTON M. WEIL, OF SCRANTON, PENNSYLVANIA, ASSIGNOR TO SAMUEL H. FRANK, OF SCRANTON, PENNSYLVANIA.

COLLAR.

Application filed April 18, 1922. Serial No. 554,606.

*To all whom it may concern:*

Be it known that I, MORTON M. WEIL, a citizen of the United States, residing at Scranton, in the county of Lackwanna and State of Pennsylvania, have invented an Improvement in Collars, of which the following is a specification.

This invention relates to a collar and more particularly to the form of turnover soft collar, although, as will be understood, the invention is not so limited, as a collar made in accordance therewith may be laundered to the form of the starched stiff collar. Heretofore, collars of the turnover soft type have been so constructed as to conform to the neck of the wearer and also assume and maintain a permanent standing condition and position; for example, by having the material woven with a weakened and preferably a curvilinear line forming the fold line to give the collar the so called set to conform to the neck and maintain its position. In all cases, in this type of collars, however, so far as I am aware, the material after having been woven in strips is cut to the collar formation and the edges bound by suitable stitches with which there may be also employed a tape or binder.

Now the object of my invention is to eliminate the additional labor and consequent expense incident to cutting out the material to form each collar and connecting the edges thereof by a suitable binder; and also to provide a collar which is woven in one piece and also woven to shape and in such a manner as to be not only reversible, but also to be provided in predetermined portions with reinforcements to enable the collar to retain its shape, to strengthen the material at the points of greatest wear, and also to provide a groove or channed for the scarf of the wearer, and the collar made in accordance with my invention will be hereinafter more particularly described.

In the drawing:

Fig. 1 is a plan of a collar made in accordance with my present invention.

Fig. 2 is a section on line 2—2, Fig. 1.

Fig. 3 is a section on line 3—3, Fig. 1.

Fig. 4 is a view similar to Fig. 1 showing another form of the invention.

Fig. 5 is a section on line 5—5, Fig. 4, and

Fig. 6 is a section on line 6—6, Fig. 4.

Referring to the drawing and particularly to Figs. 1 to 3 inclusive, the collar made in accordance with my invention comprises a band member 10 and a flap member 11. As will be understood these parts may be of the same or different material, and in either event the material may be of any suitable texture, and the material for the collar is woven in strips so that each collar portion of a strip is woven in one piece and is also woven to shape. This, as will be understood, and as known in the art, is effected by suitably adjusting and moving the parts of the loom in which the strips are woven.

In the weaving also the edge of the band member is reinforced as indicated at 12 by suitably crowding the warps or otherwise, and in the weaving also the material is provided along this edge with threads representing stitches indicated at 13. This edge of the band member is thus reinforced to strengthen the collar along the line of wear. Similarly the opposite edge of the strip or the edge of the flap member is reinforced as indicated at 14 in a similar way and is also provided in the weaving with thread representing stitches which are indicated at 15. This reinforced portion of the flap member is thus formed to cause the collar to retain its shape while being worn. In the form of the invention shown in Fig. 1 the strip of material is woven in tubular form, that is composed of two plies which are integrally woven.

In forming the collars from the strip of material hereinbefore described, the strip is cut transversely along predetermined lines, one of which is indicated at 16 in Fig. 1 to form the ends of the collar. These ends of the collar are then turned in as clearly indicated in Fig. 2 and the turned in end suitably stitched. As illustrated in the drawing, the inturned ends 17 and 18 have a line of stitching 19 running through them and the outer ply of the material, while I preferably employ a second line of stitching 20 running parallel to the stitching 19 and extending only through the outer plies of the material adjacent the extremities of the inturned ends 17 and 18. The purpose of this is to act as a binder and to form a backing for the extremities of the inturned ends to prevent the same from fraying.

Along a suitable line the band member 10 of the collar is provided with a second reinforcement indicated at 21 and 22. This is formed in a similar manner by crowding the warps in the weaving or otherwise and is employed not only to strengthen the band member but also to cooperate with the reinforced edge 12 of the band member to form a groove for the reception of the scarf which may be worn with the collar. Also as indicated in Fig. 1 of the drawing, the collar made in accordance with this invention is provided with the necessary button holes which are indicated respectively at 23, 24 and 25. In this form of the invention the line along which the parts of the collar are folded, which is the line separating the band member from the flap member, is indicated at 26.

Referring to Figs. 4, 5 and 6, it will be seen that the form of collar therein illustrated is made with a band member 27 and a flap member 28. In this instance, however, instead of the material being woven tubular throughout its entire length each collar portion is woven solid except at the end sections indicated at 29 and 30, which end sections are woven tubular in the same manner as hereinbefore described in connection with the form of the invention shown in Figs. 1, 2, and 3. Furthermore the strips of material when thus woven are reinforced in the same manner and in the same places as that described in connection with the other form of the invention; and also the ends of the collar are cut and turned in and stitched in the same manner as hereinbefore described.

From the foregoing, it will now be understood that the collar made in accordance with my invention is woven in one piece to form or shape and is reversible by the flap member being adapted to be turned over on either side of the band member, and in either position the reinforced parts of the collar provide for strengthening the same, maintaining the collar in shape and also for a groove or channel for the scarf which is worn with the collar.

It will be understood that while in the drawing I have illustrated my invention particularly adapted to a collar, and have hereinbefore specifically described the same as such, that a like or equivalent construction is equally applicable to a cuff.

I claim as my invention:

1. A collar comprising a band member and a flap member, the said members being woven tubular in one piece with a reinforced longitudinal edge provided in one member and the transverse edges inturned and stitched to form the ends of the collar.

2. A collar comprising a band member and a flap member, the said members being woven tubular in one piece with a reinforced section provided along both longitudinal edges, with the transverse edges inturned and stitched to form the ends of the collar.

3. A collar comprising a neckband and a flap, the said members being woven tubular in one piece with a reinforced section provided in the weaving at the upper portion of the band member to determine the fold line, with the transverse edges of the collar inturned and stitched to form the ends thereof.

4. A collar comprising a band member and a flap member, the said members being woven tubular in one piece, with a reinforced section provided in the weaving at the upper portion of the neck band member, reinforced portions provided in the weaving along the longitudinal edges of both the band member and flap member, with the transverse edges inturned and stitched to form the ends of the collar.

5. A collar comprising a band member and a flap member, the said members being woven tubular in one piece, with reinforced portions in the plies of the band member to determine the fold line, with the transverse edges inturned and stitched to form the ends of the collar.

6. A collar comprising a band member and a flap member, the said members being woven tubular in one piece, with both sections of the band member provided with reinforced portions to determine the fold line, there being reinforced portions provided in the weaving along the longitudinal edge of the band member and also along the longitudinal edge of the flap member, with the transverse edges inturned and stitched to form the ends of the collar.

Signed by me this 7th day of April, 1922.

MORTON M. WEIL.